(12) United States Patent
Takeda

(10) Patent No.: US 7,334,603 B2
(45) Date of Patent: Feb. 26, 2008

(54) CHECK VALVE

(75) Inventor: Tomohisa Takeda, Matsuyama (JP)

(73) Assignee: Miura Co., Ltd., Ehime-ken (JP)

( * ) Notice: Subject to any disclaimer, the term of this patent is extended or adjusted under 35 U.S.C. 154(b) by 36 days.

(21) Appl. No.: 10/854,245

(22) Filed: May 27, 2004

(65) Prior Publication Data

US 2004/0238042 A1    Dec. 2, 2004

(30) Foreign Application Priority Data

May 30, 2003   (JP)   ............................. 2003-155459

(51) Int. Cl.
*F16K 15/00*   (2006.01)
(52) U.S. Cl. ................ 137/512; 137/511; 137/516.27; 137/516.29; 137/529; 251/332
(58) Field of Classification Search ................ 137/511, 137/512, 516.27, 516.29, 529; 251/332
See application file for complete search history.

(56) References Cited

U.S. PATENT DOCUMENTS

| | | | |
|---|---|---|---|
| 716,864 A * | 12/1902 | Casey et al. ................ | 137/529 |
| 1,861,420 A * | 5/1932 | Mahan .................... | 137/516.29 |
| 1,964,249 A * | 6/1934 | Chase ..................... | 251/332 |
| 2,103,503 A * | 12/1937 | White .................... | 137/329.04 |
| 2,139,313 A * | 12/1938 | Neubauer .................. | 137/854 |
| 2,223,651 A * | 12/1940 | White et al. ............... | 251/332 |
| 2,233,649 A * | 3/1941 | Stahl et al. ............ | 137/543.13 |
| 2,521,314 A * | 9/1950 | Therolf ........................ | 251/332 |
| 2,613,054 A * | 10/1952 | Maier ........................ | 251/332 |
| 2,845,945 A * | 8/1958 | Mancusi, Jr. ................ | 137/469 |
| 2,969,951 A * | 1/1961 | Walton ....................... | 251/332 |
| 3,029,835 A | 4/1962 | Beillo et al. | |
| 3,186,430 A * | 6/1965 | Koutnik ................. | 137/516.29 |
| 3,344,807 A | 10/1967 | Lehrer et al. | |
| 3,424,427 A | 1/1969 | Ruchser et al. | |
| 3,444,889 A * | 5/1969 | Graham et al. ............. | 137/547 |
| 3,548,868 A | 12/1970 | Mullaney, III | |
| 3,789,297 A | 1/1974 | Frolich | |
| 4,049,017 A | 9/1977 | Jones | |
| 4,637,430 A | 1/1987 | Scheffel et al. | |
| 4,766,930 A | 8/1988 | Patti | |
| 4,922,957 A | 5/1990 | Johnson | |

(Continued)

FOREIGN PATENT DOCUMENTS

JP        2001-349454        12/2001

*Primary Examiner*—Kevin Shaver
*Assistant Examiner*—Craig Price
(74) *Attorney, Agent, or Firm*—Birch, Stewart, Kolasch & Birch, LLP

(57) ABSTRACT

A check valve has an elastic valve body portion and an inelastic valve body portion and a valve seat. The valve body is fixed to a valve shaft, and a valve body abutment plate for abutting the elastic valve body portion is supported to the valve shaft. The valve body abutment plate includes an elastic valve body portion pressing portion for pressing on an outer peripheral portion of the elastic valve body portion and a backflow fluid pressure exerting hole for causing fluid pressure from the fluid outlet side to be exerted on the elastic valve body portion. A spring for urging the valve body into abutment with the valve seat through the valve body abutment plate is interposed between the valve body abutment plate and a shaft support portion provided on the fluid outlet side.

11 Claims, 5 Drawing Sheets

U.S. PATENT DOCUMENTS

| | | |
|---|---|---|
| 5,088,521 A * | 2/1992 | Johnson ................. 137/516.29 |
| 5,193,577 A | 3/1993 | de Koning |
| 5,226,445 A | 7/1993 | Surjaatmadja |
| 5,343,835 A * | 9/1994 | Rhodes ................... 123/90.67 |
| 5,546,981 A | 8/1996 | Li et al. |
| 5,597,009 A | 1/1997 | Scherrer et al. |

* cited by examiner

CHECK VALVE

This Nonprovisional application claims priority under 35 U.S.C. § 119(a) on Patent Application No(s). 2003-155459 filed in JAPAN on May 30, 2003, the entire contents of which are hereby incorporated by reference.

BACKGROUND OF THE INVENTION

1. Field of the Invention

The present invention relates to a check valve for preventing backflow of a fluid, and more specifically to a check valve that opens when an expected fluid pressure is exceeded to thereby allow a fluid to flow toward the outlet side.

2. Description of the Related Art

In equipment in which a fluid is used, a check valve is used to prevent backflow of the fluid. For instance, many of feed water pipings used in water piping systems such as boilers are provided with a check valve to prevent backflow of feed water or boiler water. Boiler water has a high pressure and a high temperature, and it is therefore necessary, from the viewpoint of safety and the heatproof temperature of the pre-treatment equipment, that all possible countermeasures be taken against the backflow of the boiler water. To that end, it is necessary to take all possible measures to prevent leakage through the check valve (hereinafter also referred to as "check valve leakage"), that is, to prevent backflow of boiler water. As a measure for preventing such check valve leakage, various materials are used for a valve body that comes into abutment with a valve seat with a view to providing a complete seal between the valve seat and the valve body.

Examples of conventionally used valve bodies include an elastic valve body formed of an elastic material such as rubber and an inelastic valve body formed of an inelastic material such as metal, the latter being generally referred to as a metal seal. A check valve that relies solely on the elastic seal effected by an elastic valve body provides a good seal but is poor in pressure resistance and lacks in durability. Further, although a check valve relying solely on the metal seal effected by an inelastic valve body exhibits excellent pressure resistance and durability, even a trace amount of refuse caught between the valve seat and the valve body can cause so-called refuse clogging, which can easily impair the sealing property and make fluid backflow liable to occur.

In order to solve the above problems associated with a check valve, the applicant of the present invention has proposed a check valve including a valve chamber formed between a fluid inlet and a fluid outlet within a valve casing, a valve seat having a valve hole and formed on the fluid inlet side of the valve chamber, and a valve body provided within the valve chamber so as to be movable in the direction of fluid flow, the valve body being adapted to abut the valve seat from the fluid outlet side, wherein: the valve body is composed of an elastic valve body portion formed of an elastic material and an inelastic valve body portion formed of an inelastic material which is overlapped on the fluid inlet side surface of the elastic valve body portion and which is smaller in diameter than the elastic valve body portion; the valve seat is composed of a first valve seat portion with which the elastic valve body portion abuts and a second valve seat portion with which the inelastic valve body portion abuts after the elastic valve body portion comes into abutment with the first valve seat portion; the valve body is fixed to a valve shaft passing through a center of the valve body and having its both end portions supported by shaft support portions respectively provided on the fluid inlet and fluid outlet sides of the valve casing so as to be axially movable; and a spring for urging the valve body into abutment with the valve seat is interposed between the valve body and the support portion provided on the fluid outlet side (for example, see JP 2001-349454 A).

With this construction, a good sealing property is provided by means of the elastic valve body portion constituting the valve body, whereas high pressure resistance and durability are provided by means of the inelastic valve body portion, making it possible to obtain a check valve capable of effectively preventing a fluid backflow as compared with the check valve mentioned above, that is, the check valve that relies solely on the elastic seal effected by the elastic valve body or the check valve that relies solely on the metal seal effected by the inelastic valve body.

With the check valve disclosed in JP 2001-349454 A mentioned above, however, there is a fear that the outer peripheral portion of the elastic valve body portion which is in abutment with the first valve seat portion of the valve seat may undergo bending deformation as it is pushed toward the fluid outlet side by the fluid pressure of a fluid flowing into the fluid inlet side of the valve casing before that fluid pressure exceeds an expected pressure, that is, before the fluid pressure overcomes the elastic force of the spring interposed between the valve body and the support portion provided on the fluid outlet side, causing the outer peripheral portion to be detached from the first valve seat portion so that the fluid flows toward the outlet side. Further, the outer peripheral portion of the elastic valve body portion receives the fluid pressure of the fluid flowing in the valve chamber upon valve opening to thereby undergo bending deformation, causing a bent curl to form, which in turn leads to permanent deformation. This may impair the sealing property between the first valve seat portion of the valve seat and the outer peripheral portion of the elastic valve body portion at the time of stopping backflow, leading to check valve leakage, that is, fluid backflow.

SUMMARY OF THE INVENTION

An object of the present invention is to provide a check valve whose valve body can exhibit satisfactory sealing performance.

Another object of the present invention is to provide a check valve with which an expected fluid pressure, under which a fluid is made to flow, can be readily changed.

To attain the above objects, according to a first aspect of the present invention, there is provided a check valve including: a valve chamber formed between a fluid inlet and a fluid outlet in a valve casing; a valve seat having a valve hole and formed on a fluid inlet side of the valve chamber; a valve body adapted to abut the valve seat from a fluid outlet side, the valve body being provided in the valve chamber so as to be movable in a direction in which a fluid flows, the valve body including an elastic valve body portion formed of an elastic material and an inelastic valve body portion formed of an inelastic material, the inelastic valve body portion being overlapped on a fluid inlet side surface of the elastic valve body portion and having a smaller diameter than the elastic valve body portion, the valve seat including a first valve seat portion with which the elastic valve body portion abuts and a second valve seat portion with which the inelastic valve body portion abuts after the elastic valve body portion comes into abutment with the first valve seat portion, the valve body being fixed to a valve shaft while having a center thereof passed through by the valve shaft, the valve shaft having its both end portions supported by shaft support portions respectively provided on the fluid inlet and fluid outlet sides of the valve casing so as to be axially movable; a valve body abutment plate arranged on the fluid outlet side of the elastic valve body portion of the valve body and capable of abutting the elastic valve body portion, the valve body abutment plate being supported to the valve shaft so as to be axially movable while having a center thereof passed through by the valve shaft, the valve body abutment plate having an elastic valve body portion pressing portion provided in an outer periphery of the valve body abutment plate, for pressing on an outer peripheral portion of the elastic valve body portion, and a backflow fluid pressure exerting hole for causing a fluid pressure of the fluid from the fluid outlet side to be exerted on the elastic valve body portion; and a spring for urging the valve body into abutment with the valve seat through the valve body abutment plate, the spring being interposed between the valve body abutment plate and the shaft support portion provided on the fluid outlet side.

With the construction described above, the elastic valve body portion pressing portion provided in the outer periphery of the valve body abutment plate is urged by the springs into abutment with the outer peripheral portion of the elastic valve body portion of the valve body which is in abutment with the first valve seat portion of the valve seat from the fluid outlet side, whereby the elastic force of the springs acts, through the intermediation of the elastic valve body portion pressing portion, on the outer peripheral portion that is in abutment with the first seat valve portion of the elastic valve body portion. This action makes it possible to avoid a situation where the outer peripheral portion of the elastic valve body portion, which is in abutment with the first valve seat portion of the valve seat, undergoes bending deformation as it is pushed toward the fluid outlet side by the fluid pressure force of the fluid flowing into the fluid inlet side of the valve casing before the above-mentioned fluid pressure force of the fluid exceeds or overcomes the elastic force of the springs. Therefore, it is possible to reliably prevent a situation where the elastic valve body portion detaches from the first valve seat portion, causing the fluid to flow toward the fluid outlet side. Then, once the fluid pressure force of the fluid flowing into the fluid inlet side of the valve casing exceeds or overcomes the elastic force of the springs, the valve body detaches from the valve seat so that the fluid flows toward the fluid outlet side.

Further, upon valve opening, the elastic valve body portion receives a fluid pressure of the fluid flowing in the valve chamber; at this time, since the outer peripheral portion of the elastic valve body portion is pressed on by the elastic valve body portion pressing portion provided in the outer periphery of the valve body abutment plate, it is possible to prevent the outer peripheral portion of the elastic valve body portion from deforming due to the fluid pressure and there is no fear of the sealing property between the first valve seat portion of the valve seat and the outer peripheral portion of the elastic valve body portion being impaired. Further, even if deformation occurs due to the fluid pressure of the fluid to form a bent curl, at the time of stopping backflow, the elastic valve body portion pressing portion of the valve body abutment plate presses, upon receiving the elastic force of the springs or the fluid pressure of the backflow fluid, the outer peripheral portion of the elastic valve body portion which is abutting the first valve seat portion of the valve seat, whereby a state is attained in which the outer peripheral portion of the elastic valve body portion is sandwiched and held between the first valve seat portion and the elastic valve body portion pressing portion. Therefore, there is no fear of the sealing property being impaired, whereby check valve leakage, that is, fluid backflow can be prevented with reliability.

Further, the valve body abutment plate is supported to the valve shaft so as to be axially movable, and the backflow fluid pressure exerting holes for causing the fluid pressure from the fluid outlet side to be exerted on the elastic valve body portion are provided in the valve body abutment plate. As a result, at the time of stopping backflow, while the valve body abutment plate comes into abutment with the elastic valve body portion, which is in abutment with the first valve seat portion, to be thereby restricted in further movement, the valve body moves toward the valve seat side upon receiving the fluid pressure of a backflow fluid passing through the backflow fluid pressure exerting holes provided in the valve body abutment plate, whereby the inelastic valve body portion of the valve body can be reliably brought into abutment with the second valve seat portion of the valve seat.

According to another aspect of the present invention, in the first aspect of the invention, a plurality of the springs are arranged in parallel.

With this construction, the requisite fluid pressure for effecting valve opening, that is, the elastic force of the springs urging the valve body into abutment with the valve seat can be readily changed over a wide range. Further, the plural springs are arranged in parallel so that they can be provided within a small confined space, making it possible to achieve a reduction in overall size.

DESCRIPTION OF THE PREFERRED EMBODIMENTS

Figure 1:
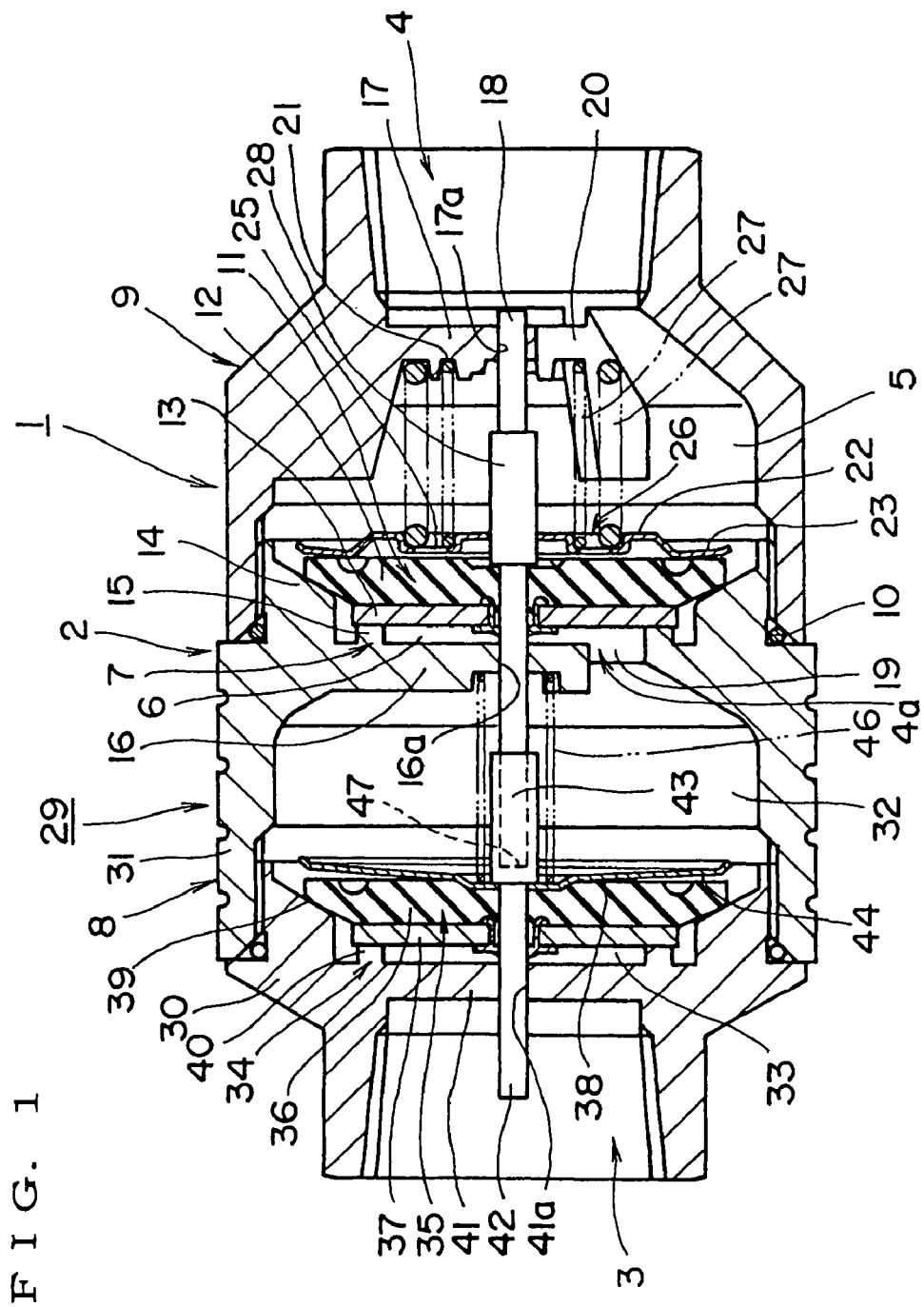
FIG. 1 is a longitudinal sectional view showing a check valve according to an embodiment of the present invention.
Figure 2:
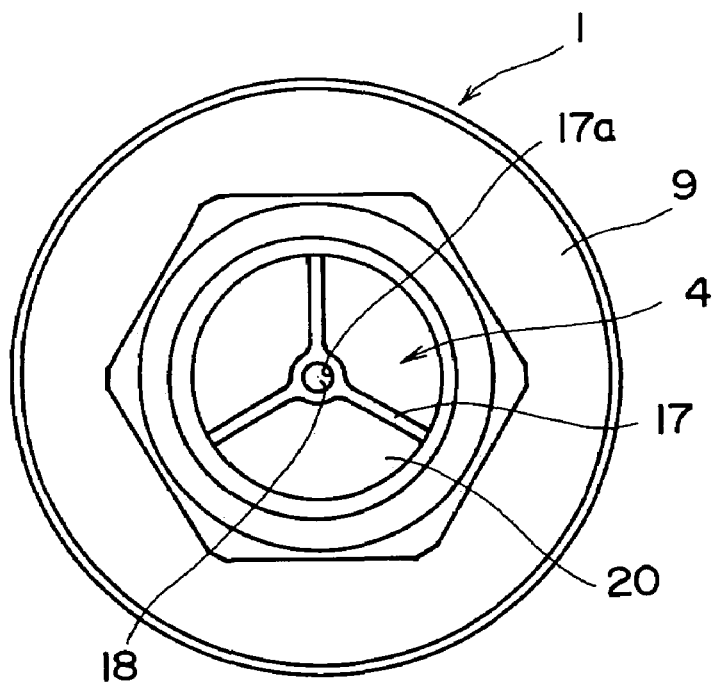
FIG. 2 is a right-hand side view of FIG. 1.
Figure 3:
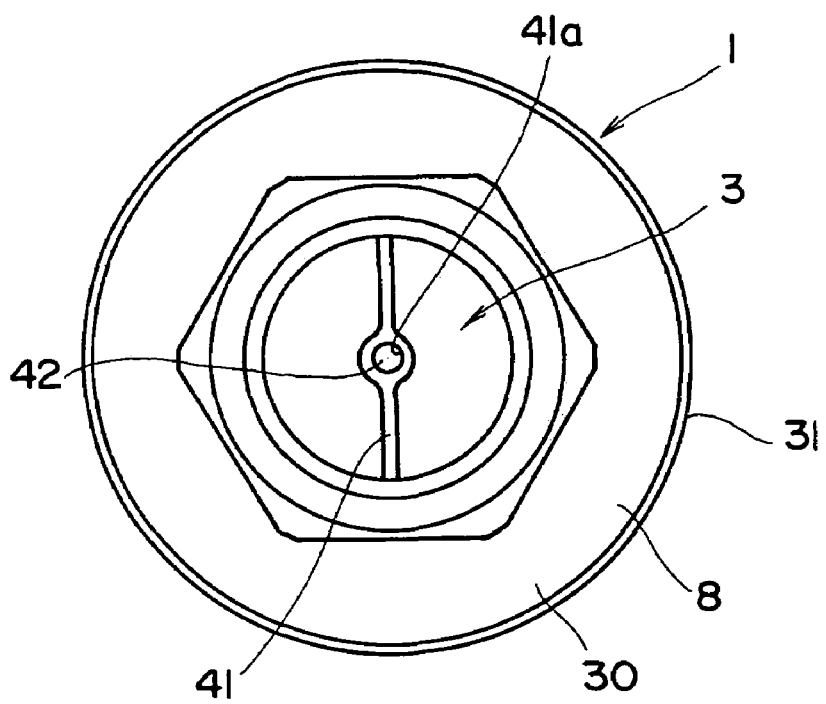
FIG. 3 is a left-hand side view of FIG. 1.
Figure 4:
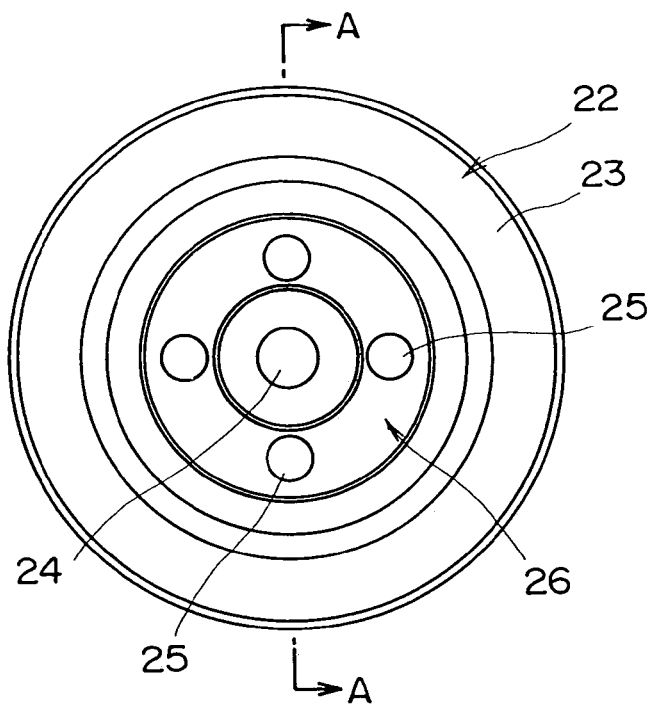
FIG. 4 is a back view of a valve body abutment plate used in the embodiment of the present invention.
Figure 5:
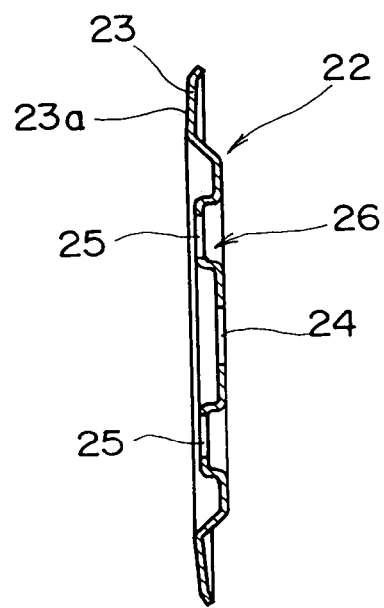
FIG. 5 is a sectional view taken along the line A-A of FIG. 4.
Figure 6:
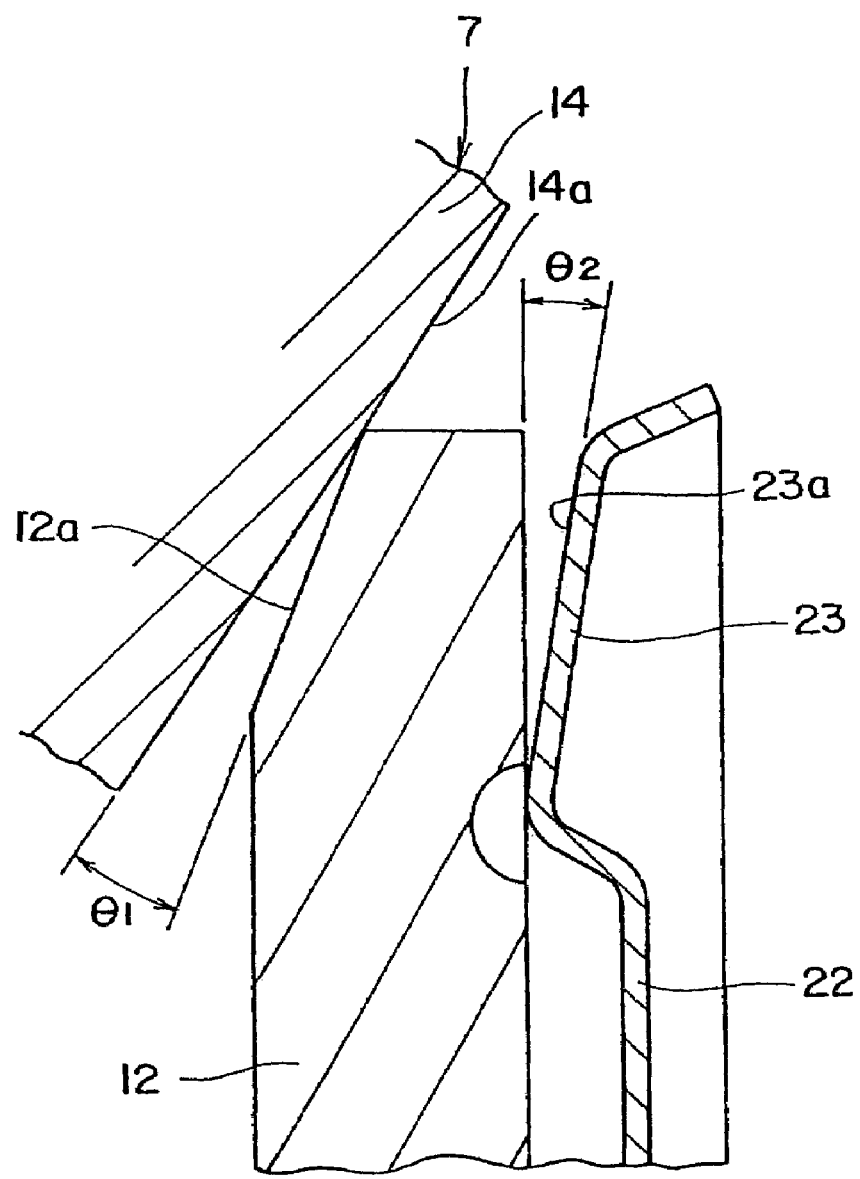
FIG. 6 is an explanatory view illustrative of an abutment portion of a valve seat, a valve body, and the valve body abutment plate according to the embodiment of the present invention.
Figure 7:
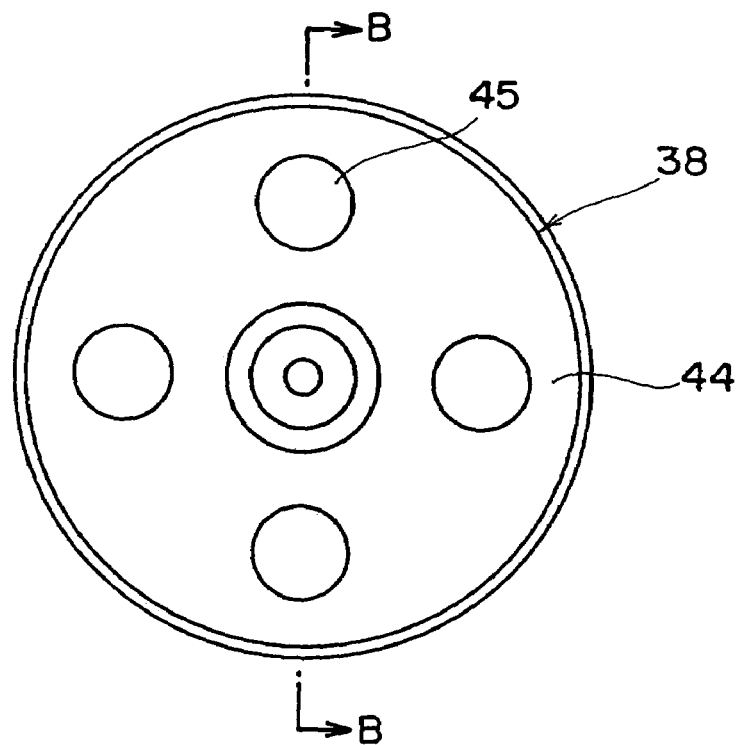
FIG. 7 is a back view of a valve body holder plate used in a second check valve that is connected in series to the check valve according to the embodiment of the present invention.
Figure 8:
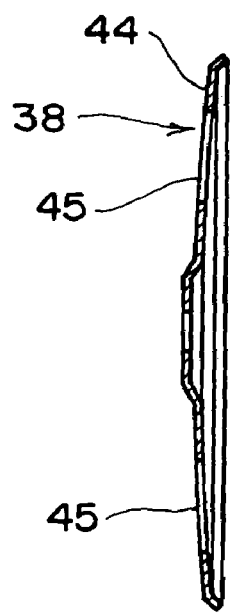
FIG. 8 is a sectional view taken along the line B-B of FIG. 7.

FIGS. 1 through 8 show a check valve according to an embodiment of the present invention. Referring to the figures, in a check valve 1 of this embodiment, a valve chamber 5 is formed between a fluid inlet 3 and a fluid outlet 4 within a valve casing 2, and a valve seat 7 with a valve hole 6 is formed on the fluid inlet 3 side of the valve chamber 5.

The valve casing 2 is composed of a tubular inflow passage member 8 having the fluid inlet 3 and serving as a piping connection portion on the inflow side, and a tubular outflow passage member 9 having the fluid outlet 4 and serving as a piping connection portion on the outflow passage side. The tubular inflow passage member 8 is threadedly attached to the tubular outflow passage member 9, with the valve chamber 5 being formed between the fluid inlet 3 of the tubular inflow passage member 8 and the fluid outlet 4 of the tubular outflow passage member 9. A seal member 10 is attached between the tubular inflow passage member 8 and the tubular outflow passage member 9.

The valve seat 7 with the valve hole 6 is formed in the tubular inflow passage member 8 constituting the fluid inlet 3 side of the valve chamber 5, and a valve body 11 adapted to abut the valve seat 7 from the fluid outlet 4 side to effect valve closure is provided within the valve chamber 5 so as to be freely movable in the direction of fluid flow.

The valve body 11 is composed of an elastic valve body portion 12 formed of an elastic material such as rubber, and an inelastic valve body portion 13 formed of an inelastic material such as metal, the inelastic valve body portion 13 being overlapped on the fluid inlet 3 side surface of the elastic valve body portion 12 and being smaller in diameter than the elastic valve body portion 12. Further, the valve seat 7 is composed of a first valve seat portion 14 with which the elastic valve portion 12 abuts and a second valve seat portion 15 with which the inelastic valve body portion 13 abuts after the elastic valve body portion 12 abuts the first valve seat portion 14. Further, the valve body 11 is fixed to a valve shaft 18 passing through the center of the valve body 11, the valve shaft 18 having its both end portions supported by shaft support portions 16 and 17 respectively provided on the fluid inlet 3 side and the fluid outlet 4 side of the valve casing 2 so as to be axially movable. The valve body 11 moves integrally with the valve shaft 18 into contact with or away from the valve seat 7.

The shaft support portions 16 and 17 have shaft insertion holes 16a and 17a through which the valve shaft 18 is inserted, and holes 19 and 20 allowing passage of a fluid, respectively. Further, formed in the shaft support portion 17 provided on the fluid outlet 4 side is a spring seat 21 for receiving one end of each spring that is described later.

Further, a valve body abutment plate 22 is supported to the valve shaft 18 so as to be axially movable while having the center thereof being passed through by the valve shaft 18, the valve body abutment plate 22 being arranged on the fluid outlet 4 side of the elastic valve body portion 12 of the valve body 11 and capable of abutting the elastic valve body portion 12. The valve body abutment plate 12 has an outer diameter that is the same or slightly larger than that of the elastic valve body portion 12 of the valve body 11. An elastic valve body portion pressing portion 23 is formed in the outer peripheral portion of the valve body abutment plate 22, for pressing on the back surface in the outer peripheral portion, that is, the fluid outlet 4 side surface, of the elastic valve body portion 12. In the plate surface of the valve body abutment plate 22, backflow fluid pressure exerting holes 25 for causing the fluid pressure from the fluid outlet 4 side to be exerted on the elastic valve body portion 12 are provided around a through hole 24 through which the valve shaft 18 passes, and there is also provided a spring receiving recess 26 for receiving the other end of each spring that is described later.

In abutment portions between the first valve seat portion 14 of the valve seat 7 and the elastic valve body portion 12 and between the elastic valve body portion 12 and the elastic valve body portion pressing portion 23, an abutment surface 14a of the first valve seat portion 14, an abutment surface 12a of the elastic valve body portion 12 which abuts the valve seat portion 14, and an abutment surface 23a in the elastic valve body portion pressing portion 23 of the valve body abutment plate 22 which abuts the elastic valve body portion 12, are all formed as tapered surfaces such that a relation $\theta 1 > \theta 2$ is satisfied, where $\theta 1$ represents an angle formed between the abutment surface 14a of the first valve seat portion 14 and the abutment surface 12a of the elastic valve body portion 12 and $\theta 2$ represents an angle formed between the back surface of the elastic valve body portion 12 and the abutment surface 23a of the elastic valve body portion pressing portion 23.

Further, interposed between the valve body abutment plate 22 and the shaft support portion 17 provided on the fluid outlet 4 side are multiple springs 27 for urging the valve body 11 into abutment with the valve seat 7 through the valve body abutment plate 22. One end of each spring 27 is received in the spring seat 21 formed in the shaft support portion 17, and the other end thereof is received in the spring receiving recess 26 formed in the valve body abutment plate 22. Those multiple springs 27 are arranged in parallel. In this embodiment, there are provided two coil-like springs with different elastic forces.

Further, in the valve shaft 18, there is provided a stopper 28 for regulating the movement amount by which the valve body 11 moves to the fluid outlet 4 side upon receiving the fluid pressure from the fluid inlet 3 side, thereby securing a flow path in the valve chamber 5. As the valve body 11 moves and reaches a predetermined position, the stopper 28 comes into abutment with the shaft support portion 17 provided on the fluid outlet 4 side and supporting the valve shaft 18, thereby restricting further movement.

In the check valve 1 of this embodiment constructed as described above, the elastic valve body portion pressing portion 23, which is provided in the outer periphery of the valve body abutment plate 22 having the same or slightly larger diameter than the elastic valve body portion 12, is urged by the springs 27 into abutment, from the fluid outlet 4 side, with the elastic valve body portion 12 of the valve body 11 whose outer peripheral portion is in abutment with the first valve seat portion 14 of the valve seat 7. Accordingly, the elastic force of the springs 27 act on the outer peripheral portion in abutment with the first valve seat portion 14 of the elastic valve body portion 12, through the intermediation of the elastic valve body portion pressing portion 23. Due to this action, a situation is avoided where the outer peripheral portion of the elastic valve body portion 12, which is in abutment with the first valve seat portion 14 of the valve seat 7, undergoes bending deformation as it is pushed toward the fluid outlet 4 side by the fluid pressure force of a fluid flowing into the fluid inlet 3 side of the valve casing 2 before the above-mentioned fluid pressure force of the fluid exceeds or overcomes the elastic force of the springs 27. Therefore, it is possible to reliably prevent a situation where the fluid flows toward the fluid outlet 4 side as the elastic valve body portion 12 detaches from the first valve seat portion 14.

Once the fluid pressure force of the fluid flowing into the fluid inlet 3 side of the valve casing 2 exceeds or overcomes the elastic force of the springs 27, the valve body 11 is detached from the valve seat 7, causing the fluid to flow toward the fluid outlet 4 side. When, at this time, the fluid pressure force of the fluid flowing into the fluid inlet 3 side of the valve casing 2 far exceeds the elastic force of the springs 27, the valve body 11 moves against the elastic force of the springs 27 toward the fluid outlet 4 side upon receiving the strong fluid pressure from the fluid inlet 3 side; when the valve body 11 thus moved reaches a predetermined position, the stopper 28 provided in the valve shaft 18 comes into abutment with the shaft support portion 17 provided on the fluid outlet 4 side to thereby restrict further movement, thus securing a flow path in the valve chamber 5.

In this embodiment, the multiple springs 27 are arranged in parallel while being interposed between the valve body abutment plate 22 and the shaft support portion 17 provided on the fluid outlet 4 side. Therefore, the requisite fluid pressure for effecting valve opening, that is, the elastic force of the springs 27 urging the valve body 11 into abutment with the valve seat 7 can be readily changed over a wide range. Further, the parallel arrangement of the multiple springs 27 means that they can be provided within a small confined space, making it possible to achieve a reduction in overall size.

Further, upon valve opening, the elastic valve body portion 12 receives a fluid pressure of the fluid flowing in the valve chamber 5; at this time, since the outer peripheral portion of the elastic valve body portion 12 is pressed on by the elastic valve body portion pressing portion 23 provided in the outer periphery of the valve body abutment plate 22, it is possible to prevent the outer peripheral portion of the elastic valve body portion 12 from deforming due to the fluid pressure and there is no fear of the sealing property between the first valve seat portion 14 of the valve seat 7 and the outer peripheral portion of the elastic valve body portion 12 being impaired.

Further, even if the outer peripheral portion of the elastic valve body portion 12 deforms due to the fluid pressure of the fluid and forms a bent curl, at the time of stopping backflow, the elastic valve body portion pressing portion 23 of the valve body abutment plate 22 presses, upon receiving the force of the springs 27 or the fluid pressure of the backflow fluid, the abutment portion of the elastic valve body portion 12 which is abutting the first valve seat portion 14 of the valve seat 7, whereby a state is attained in which the outer peripheral portion of the elastic valve body portion 12 is sandwiched and held between the first valve seat portion 14 and the elastic valve body portion pressing portion 23. Therefore, there is no fear of the sealing property being impaired, making it possible to reliably prevent leakage through the check valve 1, that is, backflow of the fluid.

In this embodiment, the abutment surface 14*a* of the first valve seat portion 14, the abutment surface 12*a* of the elastic valve body portion 12 which abuts the first valve seat portion 14, and the abutment surface 23*a* in the elastic valve body portion pressing portion 23 of the valve body abutment plate 22 which abuts the elastic valve body portion 12, are all formed as tapered surfaces such that the relation $\theta 1 > \theta 2$ is satisfied, where $\theta 1$ represents the angle formed between the abutment surface 14*a* of the first valve seat portion 14 and the abutment surface 12*a* of the elastic valve body portion 12 which abuts the first valve seat portion 14 and $\theta 2$ represents the angle formed between the back surface of the elastic valve body portion 12 and the abutment surface 23*a* of the elastic valve body portion pressing portion 23 in the valve body abutment plate 22. As a result, the elastic valve body portion 12 exhibits a large compressibility when its outer peripheral portion is sandwiched and held between the first valve seat portion 14 and the elastic valve body portion pressing portion 23, thus providing a high sealing property.

Further, the valve body abutment plate 22 is supported to the valve shaft 18 so as to be axially movable, with the backflow fluid pressure exerting holes 25 being provided in the valve body abutment plate 22 to cause the fluid pressure from the fluid outlet 4 side to be exerted on the elastic valve body portion 12. Accordingly, at the time of stopping backflow, the valve body abutment plate 22 comes into abutment with the elastic valve body portion 12 that is in turn abutting the first valve seat portion 14, thereby restricting further movement of the valve body abutment plate 22; the valve body 11, on the other hand, moves to the valve seat 7 side as it receives the fluid pressure of the backflow fluid passing though the backflow fluid pressure exerting holes 25 provided in the valve body abutment plate 22, allowing the inelastic valve body portion 13 of the valve body 11 to be reliably brought into abutment with the second valve seat portion 15 of the valve seat 7.

Note that in this embodiment, a second check valve 29 is further connected in series to the valve casing 2. The second check valve 29 is constructed as follows.

That is, the tubular inflow passage member 8 constituting the valve casing 2 is composed of two members: a piping connection member 30 having the fluid inlet 3; and a tubular member 31. The shaft support portion 16 supporting the valve shaft 18 on the fluid inlet 3 side of the check valve 1 is provided to the tubular member 31, with the shaft support portion 16 side constituting the fluid outlet 4*a* side of the second check valve 29. A second valve chamber 32 is defined between the fluid inlet 3 provided in the piping connection member 30 and the shaft support portion 16.

Further, a second valve seat 34 with a second valve hole 33 is formed in the piping connection member 30, and a second valve body 35 adapted to abut the second valve seat 34 from the fluid outlet 4 side to effect valve closure is provided within the second valve chamber 32 so as to be movable in the direction of fluid flow.

The second valve body 35 is composed of a second elastic valve body portion 36 formed of an elastic material, a second inelastic valve body portion 37 formed of an inelastic material which is smaller in diameter than the second elastic valve body portion 36 and overlapped on the fluid inlet 3 side surface of the second elastic valve body portion 36, and a valve body holder plate 38 overlapped on the fluid outlet 4*a* side surface of the second elastic valve body portion 36. Further, the second valve seat 34 is composed of a third valve seat portion 39 with which the second elastic valve body portion 36 abuts and a fourth valve seat portion 40 with which the second inelastic valve body portion 37 abuts after the second elastic valve body portion 36 comes into abutment with the third valve seat portion 39.

The second valve body 35 has its one end movably supported by a shaft support portion 41 provided to the piping connection member 30 and has its other end fixed to a second valve shaft 42 passing through the center thereof, the second valve shaft 42 being slidably supported to the valve shaft 18. Formed in the shaft support portion 41 is a shaft insertion hole 41*a* through which the second valve shaft 42 is inserted. Further, in more detail, a tube portion 43 is formed at the other end of the second valve shaft 42, with the valve shaft 18 being slidably fitted into the tube portion 43.

The valve body holder plate 38 has an outer diameter that is the same or slightly larger than the outer diameter of the second elastic valve body portion 36, and is adapted to support the second elastic valve body portion 36 from the back surface side to thereby prevent deformation of the second elastic valve body portion 36. Further, the outer peripheral portion of the valve body holder plate 38 is formed into an inclined surface 44 inclined so as to move slightly apart from the outer peripheral portion of the second elastic valve body portion 36. This enables slight movement of the second elastic valve body portion 36 toward the fluid inlet 3 side upon compressive deformation, which is required for the second inelastic valve body portion 37 to abut the fourth valve seat portion 40 after the second elastic valve body portion 36 comes into abutment with the third valve seat portion 39. Further, in the valve body holder plate 38, there are provided backflow fluid pressure exerting holes 45 for causing the fluid pressure from the fluid outlet 4a side to be exerted on the second elastic valve body portion 36.

Further, interposed between the second valve body 35 and the shaft support portion 16 provided in the tubular member 31 is a second spring 46 for urging the second valve body 35 into abutment with the second valve seat 34.

Further, in the second valve shaft 42, there is provided a stopper 47 for regulating the movement amount by which the second valve body 35 moves to the fluid outlet 4a side upon receiving the fluid pressure from the fluid inlet 3 side, thereby securing a flow path in the second valve chamber 32. The bottom of the tube portion 43 formed at the other end of the second valve shaft 42 serves as the stopper 47. As the second valve body 35 moves and reaches a predetermined position, the forward end of the valve shaft 18 comes into abutment with the bottom of the tube portion 43 which serves as the stopper 47, thereby restricting further movement.

With the second check valve 29 constructed as described above, when the fluid pressure force of a fluid flowing into the fluid inlet 3 side of the valve casing 2 exceeds or overcomes the elastic force of the second spring 46, the second valve body 35 detaches from the second valve seat 34, causing the fluid to flow toward the valve chamber 5 side through the hole 19 formed in the shaft support portion 16 provided in the tubular member 31 whereby the fluid pressure is applied to the valve body 11. While, at this time, the second elastic valve body portion 36 receives the fluid pressure of a fluid flowing in the second valve chamber 32, the second elastic valve body portion 36 is held from its back surface side by the valve body holder plate 38, thereby preventing deformation thereof due to the fluid pressure.

Further, when the fluid pressure force of the fluid flowing into the fluid inlet 3 side of the valve casing 2 exceeds the elastic force of the second spring 46, the second valve body 35 moves against the elastic force of the second spring 46 toward the fluid outlet 4a side upon receiving the strong fluid pressure force from the fluid inlet 3 side; once the second valve body 35 thus moved reaches a predetermined position, its further movement is restricted by the stopper 47 provided in the second valve shaft 42, thus securing a flow path in the second valve chamber 32. At the time of stopping backflow, on the other hand, the second valve body 35 comes into abutment with the second valve seat 34 upon receiving the elastic force of the second spring 46 or the fluid pressure of a backflow fluid, thereby preventing fluid backflow.

When, as described above, the check valve 1 and the second check valve 29 are interconnected in series within the valve casing 2, it is possible to more reliably prevent valve opening from being effected before the fluid pressure of a fluid flowing into the fluid inlet 3 side of the valve casing 2 exceeds an expected fluid pressure, or, at the time of stopping backflow, prevent fluid backflow from occurring. Furthermore, when the elastic force of the springs 27 of the check valve 1 is set larger than that of the second spring 46 of the second check valve 29, the elastic force of the springs 27 brings the valve body 11 into abutment with the valve seat 7 to thereby close the valve hole 6 immediately upon effecting stoppage of backflow, making it possible to prevent fluid backflow with enhanced reliability.

As described above, with the check valve of the present invention, it is possible to avoid a situation where the outer peripheral portion of the elastic valve body portion, which is in abutment with the first valve seat portion of the valve seat, undergoes bending deformation as it is pushed toward the fluid outlet side by the fluid pressure force of a fluid flowing into the fluid inlet side of the valve casing before the above-mentioned fluid pressure force of the fluid exceeds or overcomes the elastic force of the springs. Therefore, it is possible to reliably prevent a situation where the elastic valve body portion detaches from the first valve seat portion, causing the fluid to flow toward the fluid outlet side. Further, it is possible to prevent the outer peripheral portion of the elastic valve body portion from deforming due to the fluid pressure of a fluid flowing in the valve chamber upon valve opening, whereby there is no fear of the sealing property between the first valve seat portion of the valve seat and the outer peripheral portion of the elastic valve body portion being impaired. Further, even if deformation occurs due to the fluid pressure of the fluid to form a bent curl, at the time of stopping backflow, the elastic valve body portion pressing portion of the valve body abutment plate presses, upon receiving the force of the springs or the fluid pressure of the backflow fluid, the outer peripheral portion of the elastic valve body portion abutting the first valve seat portion of the valve seat, whereby a state is attained in which the outer peripheral portion of the elastic valve body portion is sandwiched and held between the first valve seat portion and the elastic valve body portion pressing portion. Therefore, there is no fear of the sealing property being impaired, whereby check valve leakage, that is, fluid backflow can be prevented with reliability.

Further, the valve body abutment plate is supported to the valve shaft so as to be axially movable, and the backflow fluid pressure exerting holes for causing the fluid pressure from the fluid outlet side to be exerted on the elastic valve body portion are provided in the valve body abutment plate. As a result, at the time of stopping backflow, while the valve body abutment plate comes into abutment with the elastic valve body portion abutting the first valve seat portion to be thereby restricted in further movement, the valve body moves toward the valve seat side upon receiving the fluid pressure of a backflow fluid passing through the backflow fluid pressure exerting holes provided in the valve body abutment plate, whereby the inelastic valve body portion of the valve body can be reliably brought into abutment with the second valve seat portion of the valve seat.

What is claimed is:

1. A check valve comprising:

a valve chamber formed between a fluid inlet and a fluid outlet in a valve casing;

a valve seat having a valve hole and formed on a fluid inlet side of the valve chamber;

a valve body adapted to abut the valve seat from a fluid outlet side, the valve body being provided in the valve chamber so as to be movable in a direction in which a fluid flows, the valve body including an elastic valve body portion formed of an elastic material and an inelastic valve body portion formed of an inelastic material, the inelastic valve body portion being overlapped on a fluid inlet side surface of the elastic valve body portion and having a smaller diameter than the elastic valve body portion, the valve seat including a first valve seat portion with which the elastic valve body portion abuts and a second valve seat portion with which the inelastic valve body portion abuts after the elastic valve body portion comes into abutment with the first valve seat portion, the valve body being fixed to a valve shaft while having a center thereof passed through by the valve shaft, the valve shaft having its both end portions supported by shaft support portions respectively provided on the fluid inlet and fluid outlet sides of the valve casing so as to be axially movable;

a valve body abutment plate arranged on the fluid outlet side of the elastic valve body portion of the valve body and capable of abutting the elastic valve body portion, the valve body abutment plate being supported to the valve shaft so as to be axially movable relative to the valve shaft while having a center opening passed through by the valve shaft, the valve body abutment plate having:

an elastic valve body portion pressing portion provided in an outer periphery of the valve body abutment plate, for pressing on an outer peripheral portion of the elastic valve body portion; and a backflow fluid pressure exerting hole for causing a fluid pressure of the fluid from the fluid outlet side to be exerted on the elastic valve body portion; and a spring for urging the valve body into abutment with the valve seat through the valve body abutment plate, the spring being interposed between the valve body abutment plate and the shaft support portion provided on the fluid outlet side.

2. The check valve of claim 1 including at least one second spring urging the valve body into abutment with the valve seat.

3. The check valve of claim 1 wherein said valve body abutment plate includes an annular periphery and an annular channel inward of said periphery.

4. The check valve of claim 1 wherein said valve body abutment plate includes a center portion and an annular ridge outward of the center portion.

5. The check valve of claim 4 wherein said backflow fluid pressure exerting hole is formed in said annular ridge.

6. A check valve comprising:

a valve chamber formed between a fluid inlet and a fluid outlet in a valve casing;

a valve seat having a valve hole and formed on a fluid inlet side of the valve chamber;

a valve body adapted to abut the valve seat from a fluid outlet side, the valve body being provided in the valve chamber so as to be movable in a direction in which a fluid flows, the valve body including an elastic valve body portion formed of an elastic material and an inelastic valve body portion formed of an inelastic material, the inelastic valve body portion being overlapped on a fluid inlet side surface of the elastic valve body portion and having a smaller diameter than the elastic valve body portion, the valve seat including a first valve seat portion with which the elastic valve body portion abuts and a second valve seat portion with which the inelastic valve body portion abuts after the elastic valve body portion comes into abutment with the first valve seat portion, the valve body being fixed to a valve shaft while having a center thereof passed through by the valve shaft, the valve shaft having its both end portions supported by shaft support portions respectively provided on the fluid inlet and fluid outlet sides of the valve casing so as to be axially movable;

a valve body abutment plate arranged on the fluid outlet side of the elastic valve body portion of the valve body and capable of abutting the elastic valve body portion, the valve body abutment plate being supported to the valve shaft so as to be axially movable while having a center thereof passed through by the valve shaft, the valve body abutment plate having:

an elastic valve body portion pressing portion provided in an outer periphery of the valve body abutment plate, for pressing on an outer peripheral portion of the elastic valve body portion; and a backflow fluid pressure exerting hole for causing a fluid pressure of the fluid from the fluid outlet side to be exerted on the elastic valve body portion; and a spring for urging the valve body into abutment with the valve seat through the valve body abutment plate, the spring being interposed between the valve body abutment plate and the shaft support portion provided on the fluid outlet side wherein said valve body abutment plate includes a center portion and an annular ridge outward of the center portion and wherein said backflow fluid pressure exerting hole is formed in said annular ridge.

7. A check valve comprising:

a valve chamber formed between a fluid inlet and a fluid outlet in a valve casing;

a valve seat having a valve hole and formed on a fluid inlet side of the valve chamber;

a valve body adapted to abut the valve seat from a fluid outlet side, the valve body being provided in the valve chamber so as to be movable in a direction in which a fluid flows, the valve body including an elastic valve body portion formed of an elastic material and an inelastic valve body portion formed of an inelastic material, the inelastic valve body portion being overlapped on a fluid inlet side surface of the elastic valve body portion, the valve seat including a first valve seat portion with which the elastic valve body portion abuts and a second valve seat portion with which the inelastic valve body portion abuts, the valve body being fixed to a valve shaft while having a center thereof passed through by the valve shaft, the valve shaft having first and second end portions supported by shaft support portions respectively provided on the fluid inlet and fluid outlet sides of the valve casing so as to be axially movable;

a non-planar valve body abutment plate arranged on the fluid outlet side of the elastic valve body portion of the valve body and abutting the elastic valve body portion, the valve body abutment plate being supported to the valve shaft so as to be axially movable relative to the valve shaft while having a center thereof passed through by the valve shaft, the valve body abutment plate having:

an elastic valve body portion pressing portion provided in an outer periphery of the valve body abutment plate, for pressing on a circumferential portion of the elastic valve body portion; and a backflow fluid pressure exerting hole for allowing a fluid pressure of the fluid from the fluid outlet side to be exerted on the elastic valve body portion; and at least one spring for urging the valve body into abutment with the valve seat through the valve body abutment plate.

8. The check valve of claim 7 wherein said at least one spring comprises a plurality of springs.

9. The check valve of claim 7 wherein said valve body abutment plate includes an annular periphery and an annular channel inward of said periphery.

10. The check valve of claim 7 wherein said valve body abutment plate includes a center portion and an annular ridge outward of said center portion.

11. The check valve of claim 10 wherein said backflow fluid pressure exerting hole is formed in said annular ridge.

* * * * *